United States Patent [19]

Schülling

[11] Patent Number: 5,044,914
[45] Date of Patent: Sep. 3, 1991

[54] SCOOP FOR COUNTING SERVING PORTIONS OF FOOD

[76] Inventor: Christof Schülling, Am Sportfeld 7, 8729 Sand am Main, Fed. Rep. of Germany

[21] Appl. No.: 477,852
[22] PCT Filed: Jun. 28, 1988
[86] PCT No.: PCT/DE88/00387
   § 371 Date: Jan. 9, 1990
   § 102(e) Date: Jan. 9, 1990
[87] PCT Pub. No.: WO89/00383
   PCT Pub. Date: Jan. 26, 1989

[30] Foreign Application Priority Data

Jul. 10, 1987 [DE] Fed. Rep. of Germany ....... 3722822

[51] Int. Cl.$^5$ .............................................. B28B 1/00
[52] U.S. Cl. .................................... 425/169; 425/285
[58] Field of Search ............... 425/140, 276, 277, 279, 425/282, 286, 169, 285; 222/36, 38; 374/141, 157; 249/77

[56] References Cited

U.S. PATENT DOCUMENTS

| 2,137,133 | 6/1934 | Dallmann | 222/36 |
| 2,339,289 | 1/1944 | Olken | 374/141 |
| 2,912,163 | 11/1959 | Van Tuyl | 374/141 |
| 3,277,714 | 10/1966 | Crandell et al. | 374/157 |
| 3,277,717 | 10/1966 | Yerman | 374/141 |
| 3,535,770 | 10/1970 | Crandell et al. | 374/157 |
| 4,555,040 | 11/1985 | Butenschön | 374/141 |
| 4,583,868 | 4/1986 | Girling | 374/141 |

FOREIGN PATENT DOCUMENTS 2924199 6/1979 Fed. Rep. of Germany .
1236024 6/1971 United Kingdom .

*Primary Examiner*—Jay H. Woo
*Assistant Examiner*—Robert B. Davis
*Attorney, Agent, or Firm*—Edwin D. Schindler

[57] ABSTRACT

A food scoop is disclosed which disposes a temperature sensor in or on a spoon portion (which includes a handle), which is utilized for the scooping operation. The temperature sensor includes a counting mechanism that records the temperature changes of the spoon and uses them as a counting impulse. Most foods, whether such foods be ice cream or heated selections, have sharp temperature gradients which are counted and recorded by the scoop portion of the invention. The number of temperature changes counted by the counting mechanism equals the number of portions of a particular food which have been served.

20 Claims, 1 Drawing Sheet

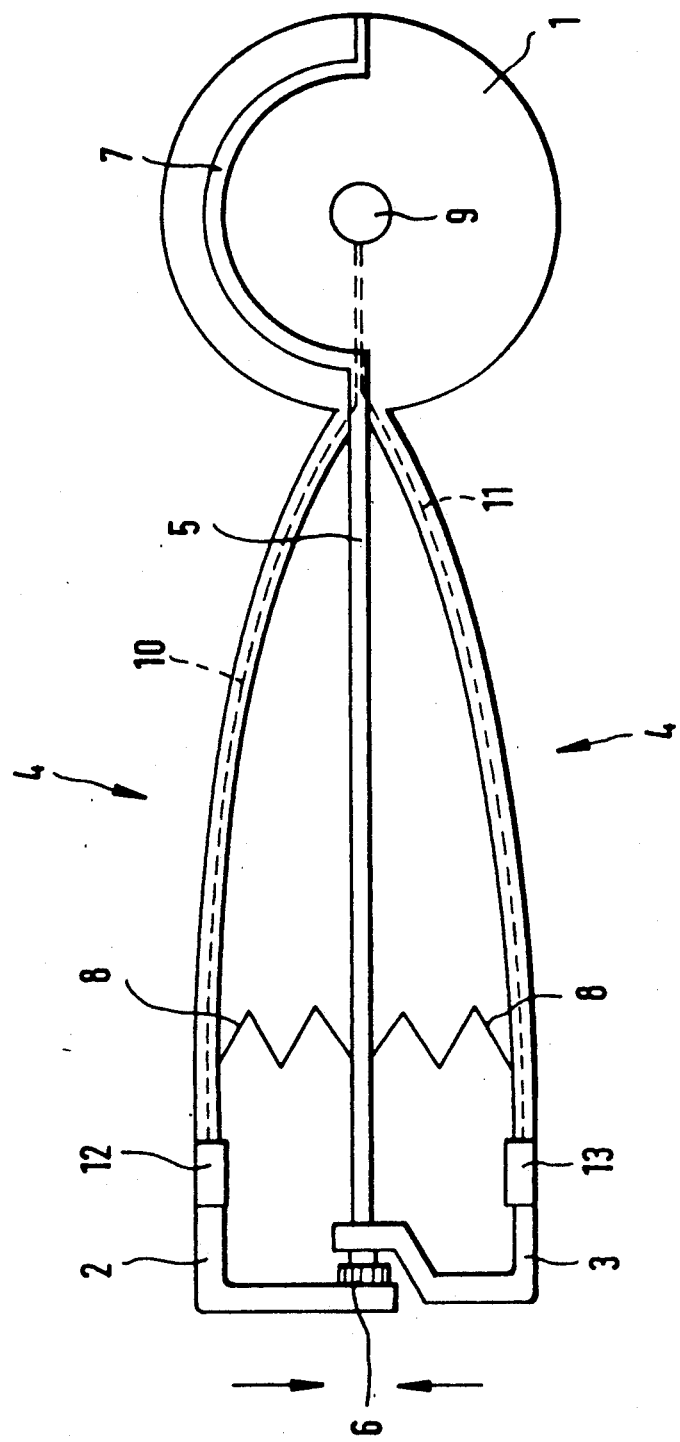

SCOOP FOR COUNTING SERVING PORTIONS OF FOOD

BACKGROUND OF THE INVENTION

The invention concerns a scoop for serving portions of food, especially ice cream, comprising a handle attached to a spoon.

In the gastronomic trade portioning scoops are used for removing and measuring a quantity suitable for consumption. By immersing or scraping from a larger quantity of food— this may be ice cream, mashed potato, dessert, chocolate mousse, cream, rice or similar— a suitable portion is grasped by a spoon formed as a semicircular shell, transferred to the place of dispensing, and there deposited in the dessert bowl or ice cream cone, which is usually accomplished therein that a wiper is disposed in the shell-shaped spoon, which by operation of the handle executes a swivel motion along the interior surface of the spoon, and in this manner scrapes off the particular food and releases it in the form of a hemisphere.

Not last it is known through the sale of ice cream that the price required from the customer is determined by the quantity of food from the number of dispensed portions. For an entrepreneur and businessman problems often occur through the fact that with dispensing by an employee, a control of the dispensed quantity is in principal impossible, so that the possibility of personal gain is open to the employee, and is often found to occur.

SUMMARY OF THE INVENTION

On this basis it is the object of this invention further to develop this type of portioning scoop in such a manner that direct and unfalsifiable recording of the total dispensed quantity is possible.

According to this invention two solutions which can be realized completely independently of each other are proposed. One consists in disposing a temperature sensor in the spoon, which records the temperature changes and uses them as a counting impulse.

The solution according to this invention is suitable for apportioning all foods that have a temperature deviating upwardly or downwardly from that of the surrounding room. This is the general case. Foods intended for consumption, such as purée, rice, and most desserts have a higher temperature, and other foods such as ice cream, fruits and similar a considerably lower temperature. Thus the temperature of ice cream is usually −12 to −14 degrees Celsius. The function is as follows: upon the food being grasped with the portioning scoop, a temperature transfer takes place which is registered and signalled by the temperature sensor. These changes can be recorded preferably electronically, altered, and used as a counting impulse. The processing and adaptation to the counting unit need not be described in detail, and are familiar per se to a person skilled in the art, who for example differentiates the signals from the temperature sensor and transmits the signals of one polarity to a counter, and for example suppresses the others, so that as a result only the temperature increase and not the temperature decrease is recorded and counted. In order to suppress faults and faulty readings, thresholds can be specified, which when exceeded register a counting impulse. Furthermore, measures can be taken so that only rapid temperature changes are recorded and counted, since natural temperature fluctuations take place relatively slowly, and naturally should not be recorded.

The temperature sensor should be chosen such that it operates as fast as possible and without inertia, especially because if it is attached, for example, with an adhesive, a certain thermal insulation is caused. For improved processing of the signal it is further recommended to use temperature sensors with greater sensitivity, i.e. those that provide a strong output signal upon small temperature changes in the particular measuring range. The larger are the output signals, even with small temperature changes, the better is the processing and the faster can small temperature fluctuations be recorded. The latter is of importance since the heating or cooling of the portioning scoop takes place only within a relatively short time. Experiments have shown that even fractions of a second are sufficient to provide signals that can be evaluated. It is especially recommended because of the short dwell time within the portioning scoop to record the temperature change that this causes and evaluate it as a counting impulse, since the temperature of the respective food hardly changes during the dwell time, and is not even approximately attained.

For the concept of this invention it is in principle immaterial whether the respective output number of portions is indicated directly or stored in some manner and read out and ascertained by a special interrogation means, disposed for example on the portioning scoop. It is decisive that after the elapse of a certain time interval, i.e. after the passing of some days, the sold quantity can be indicated by the device according to this experiment, and be compared with the respective money income. The possibility of illicit dealing is thus excluded.

For the case that the scoop comprises a scraper, the temperature sensor may even be disposed on this.

For the concrete structural embodiment of the temperature sensor it is recommended within the scope of this invention that this be embodied as a thermocouple or as a temperature dependent resistance, especially as an NTC or PTC thermistor. "NTC" and "PTC" stand for "negative temperature coefficient" and "positive temperature coefficient," respectively.

A thermocouple is known to comprise two different metals that are welded together at their ends and produce a thermal voltage when the two ends forming the transition between the two metals are maintained at different temperatures. The thermal voltage thus formed is proportional to the temperature difference. The advantage of this embodiment consists in a rapid reaction to temperature changes and to the direct contact with the material that is to be measured. Comparatively very low measuring signals for small temperature changes are disadvantageous. A stronger signal can be achieved by using a thermopile, i.e. a serial connection of several thermocouples, which then, however, have a greater space requirement. Another possibility consists in using a temperature-dependent resistor as temperature sensor. Resistors comprising principally metal may be used for this, which increase their value with increasing temperature (PTC thermistors). By contrast, semiconductor resistors with large negative temperature coefficients (approx. −3% per degree Celsius), so-called NTC thermistors are considerably more sensitive to temperature fluctuations. Since in a concrete case the change of resistance of the NTC thermistor is caused by external heating they are already used in other fields of application for temperature measurement.

It is in principle conceivable to dispose the power supply and/or the electronic components also external to the portioning scoop and to make the connection by means of lead wires. From the point of view of handling it is preferred to house the power supply (battery) and/or the electronic components in the handle of the portioning scoop, so that no leads are necessary and no obstructions to the handling can occur.

Because of the possibility in principle of using one and the same portioning scoop for different foods that have different working ranges, it is recommended that an adjustment means be provided, with which the measuring range of the temperature sensor can be converted. For exact results, one and the same portioning scoop may be used both for ice cream as well as for hot foods. Otherwise one or other measuring range would not be optimum and could lead to faulty readouts and incorrect results.

A prime object of the present invention is to reliably design the counting mechanism of the portioning scoop in such a manner that, as far as can be judged, it cannot produce incorrect readouts even with deliberate mishandling. For this reason it is proposed in a further embodiment to record each mechanical operation, as well as the temperature changes, so that a counting impulse can only be produced if both events occur simultaneously or with a time lag. In a known manner this can be achieved by linking with an "AND gate". Temperature changes recorded by the temperature sensor only lead to a counting impulse if a mechanical operation of the portioning scoop occurs simultaneously.

As already mentioned, the portioning scoop can be linked via a lead to the power supply or the evaluating electronics. It is possible simultaneously to provide the portioning scoop with a lead, since, for example, in the case where a thermocouple is used as temperature sensor the temperature of the washing water used for cleaning and temporary storage of the portioning scoop is registered with the other comparison point of the thermocouple. Naturally, the thermocouple then only gives a signal when the temperature deviates from the measuring point defined by the location of the temperature sensor. It is rational to record the deviation in only one direction for a counting impulse. For the dispensing of ice cream, a count is only registered when the temperature sensor is cooler with respect to the washing water, for the dispensing of hot foods, by contrast, when it is higher. Naturally the lead can be used on the one hand for the above described comparison with the temperature of the washing water for the scoop, as well as for supplying power and/or transmitting signals.

Completely independent of the above described embodiments, another solution is proposed by the invention, which is characterized by an electrode being disposed on the interior of the scoop, which is connected by a line to another electrode in or beneath the food that is to be recorded, whereby a counting unit responding to a current or resistance measurement is disposed in the line.

The invention here utilizes the fact that most foods, ice creams and similar have a certain moisture content, and thus an electrical conductivity. This has the result that upon immersion of the electrode disposed on the interior of the scoop in the food, an electrically conducting connection is made, and a closed electrical circuit occurs, whereupon the food produces the electrical connection between the two electrodes. In a normal, i.e. unimmersed, state, the resistance between the two electrodes is infinite, so that no current can flow. The immersion of the scoop can be recorded by current and/or resistance measurement between the electrodes, and transmitted to a suitable counting unit. With each immersion a new impulse is registered in the counting unit. Special circuitry measures can be provided which prevent a counting action when a multiple contact occurs within a short time, such as occurs upon filling the scoop by multiple scraping actions. A disadvantage of this can be seen in the fact that a wire must be disposed between the portioning scoop and the electrode located in or beneath the food, which impairs the free handling.

The described option can naturally also be transmitted to the counting unit simultaneously with the aforementioned measures requiring a temperature sensor, if necessary by coupling via an "AND" gate. The currents and voltages occurring during the work can be selected low so that they are harmless and imperceptible to the operating person.

An especially simple constructional solution consists in using the scoop itself as an electrode. This is especially recommended if the scoop itself comprises electrically conductive material, such as, for example, a metal. The additional attachment of an electrode is then unnecessary.

It is especially proposed to carry out the resistance measurement via the familiar bridge circuit. The requirements for measuring accuracy can be very low if it must only be determined whether the resistance between the electrodes is infinite, or it assumes a finite value during the immersion.

BRIEF DESCRIPTION OF THE DRAWING

Further details, features and advantages of the invention can be taken from the following descriptive part in which an embodiment of the invention is shown in plan view. It shows a portioning scoop according to the invention in schematic view.

DETAILED DESCRIPTION OF THE DRAWING

In a familiar manner the illustrated portioning scoop comprises a spoon 1 and a handle 3 comprising two shanks 2, 3 movable with respect to each other.

A shaft extends approximately in the center between the two shanks 2, 3, which is rotatably disposed in one shank 3, and is provided with a gear wheel 6 in the vicinity of the end of said shank 2, which in turn engages with this said shank 2. This has the consequence that upon relative movements of the two shanks 2, 3 with respect to each other said shaft is set into rotation by engagement of said gear wheel 6, and thus traverses the scraper 7 rigidly affixed to the opposite end, which is mounted in said scoop 1 at the opposite end to said shaft 5. The scraper 7 is formed such that it is movable along the inner side of the hemispherically shaped scoop 1, and scrapes off and releases the material located there. With the removal of the applied force, the two shanks 2, 3 return to their starting positions under the effect of springs 8. All the described parts are known per se.

It is decisive that a temperature sensor is located in said scoop 1, which is connected via an electrical wire 10, 11 with an electronic counting mechanism 12 with display, as well as with a battery 13 serving to supply electrical power. Components 12, 13, and predominantly lines 10, 11 extend internally within said handle. Only the display of the counting mechanism 12 is visible externally.

Upon grasping of the food that is to be portioned with the aid of scoop 1, the temperature sensor 9 undergoes a heating or cooling, which is registered in the counting mechanism 12 as a counting impulse after evaluation and processing of the received signal. The power supply of the electronic counting circuit is provided by battery 13.

As a result a portioning scoop is obtained which indicates the overall dispensed quantity via the number of portions, and thus makes the corresponding received payment calculable.

I claim:

1. A portioning scoop for food, comprising:
   a handle;
   a spoon affixed to said handle; and,
   a temperature sensor constituting a part of said spoon, said temperature sensor including means for recording and counting the number of temperature changes of said spoon.

2. The portioning scoop for food according to claim 1, wherein said means for recording and counting the number of temperature changes of said spoon is an interrogation unit.

3. The portioning scoop for food according to claim 1, wherein said spoon further includes a scraper with said temperature sensor being disposed within said scraper.

4. The portioning scoop for food according to claim 1, wherein said temperature sensor includes a thermocouple.

5. The portioning scoop for food according to claim 1, wherein said temperature sensor includes a temperature dependent resistor.

6. The portioning scoop for food according to claim 5, wherein said temperature dependent resistor is a negative temperature coefficient thermistor.

7. The portioning scoop for food according to claim 5, wherein said temperature dependent resistor is a positive temperature coefficient thermistor.

8. The portioning scoop for food according to claim 1, further comprising power supply means which are disposed in said handle.

9. The portioning scoop for food according to claim 8, wherein said power supply means is a battery.

10. The portioning scoop for food according to claim 1, wherein said temperature sensor includes an adjustable measuring range.

11. The portioning scoop for food according to claim 1, wherein said temperature sensor further includes means for registering a counting impulse upon mechanical operation of said portioning scoop and a temperature change.

12. The portioning scoop for food according to claim 1, further comprising a lead which is connected to said portioning scoop, said lead being capable of linkage to a power supply and able to record a temperature of washing water held within a container for said portioning scoop.

13. A portioning scoop for food, comprising:
    a handle; a first electrode; a second electrode; an electrical wire; a spoon affixed to said handle wherein said first electrode is attached on an inside portion of said spoon, said first electrode being connected to said electrical wire which is, in turn, connected to said second electrode disposed in close proximity to the food being scooped; and means connected to said wire for counting changes in an electrical measurement across said electrodes.

14. The portioning scoop for food according to claim 13, wherein said counting means is responsive to a resistance measurement as said electrical measurement.

15. The portioning scoop for food according to claim 14, wherein said resistance is carried out by means of a bridge circuit.

16. The portioning scoop for food according to claim 13, wherein said counting means is responsive to a current measurement as said electrical measurement.

17. A portioning scoop for food, comprising:
    a handle; a separate electrode; an electrical wire; a spoon, simultaneously functioning as an electrode, is affixed to said handle, said spoon being connected to said electrical wire which is, in turn, connected to said separate electrode disposed in close proximity to the food being scooped; and means connected to said wire for counting changes in an electrical measurement across said electrodes.

18. The portioning scoop for food according to claim 17, wherein said counting means mechanism is responsive to a resistance measurement as said electrical measurement.

19. The portioning scoop for food according to claim 18, wherein said resistance is carried out by means of a bridge circuit.

20. The portioning scoop for food according to claim 17, wherein said counting means is responsive to a current measurement as said electrical measurement.

* * * * *